(12) United States Patent
Langdon et al.

(10) Patent No.: US 7,712,528 B2
(45) Date of Patent: May 11, 2010

(54) PROCESS FOR DISPERSING NANOCATALYSTS INTO PETROLEUM-BEARING FORMATIONS

(75) Inventors: John E. Langdon, Fort Worth, TX (US); Charles H. Ware, Palm Harbor, FL (US)

(73) Assignee: World Energy Systems, Inc., Fort Worth, TX (US)

( * ) Notice: Subject to any disclaimer, the term of this patent is extended or adjusted under 35 U.S.C. 154(b) by 98 days.

(21) Appl. No.: 12/016,829

(22) Filed: Jan. 18, 2008

(65) Prior Publication Data

US 2008/0217008 A1    Sep. 11, 2008

Related U.S. Application Data

(63) Continuation-in-part of application No. 11/868,707, filed on Oct. 8, 2007.

(60) Provisional application No. 60/885,442, filed on Jan. 18, 2007, provisional application No. 60/850,181, filed on Oct. 9, 2006, provisional application No. 60/857,073, filed on Nov. 6, 2006.

(51) Int. Cl.
*E21B 43/24* (2006.01)

(52) U.S. Cl. .................. 166/272.4; 166/263; 166/300; 166/302; 166/371

(58) Field of Classification Search .............. None
See application file for complete search history.

(56) References Cited

U.S. PATENT DOCUMENTS

| | | |
|---|---|---|
| 4,930,454 A | 6/1990 | Latty et al. |
| 5,055,030 A | 10/1991 | Schirmer |
| 5,255,742 A | 10/1993 | Mikus |
| 5,404,952 A | 4/1995 | Vinegar et al. |
| 5,488,990 A | 2/1996 | Wadleigh et al. |
| 5,623,576 A | 4/1997 | Deans |
| 5,832,999 A | 11/1998 | Ellwood |
| 5,862,858 A | 1/1999 | Wellington et al. |
| 5,899,269 A | 5/1999 | Wellington et al. |
| 5,935,419 A | 8/1999 | Khan et al. |
| 6,016,867 A | 1/2000 | Gregoli et al. |

(Continued)

OTHER PUBLICATIONS

Comparative Analysis of Stem Delivery Cost for Surface and Downhole Steam Drive Technologies, Sandia national Labs., Albuquerque, NM, Oct. 1981, National Technical Information Services.

(Continued)

*Primary Examiner*—Zakiya W. Bates
(74) *Attorney, Agent, or Firm*—Patterson & Sheridan LLP

(57) ABSTRACT

Embodiments include methods for recovering petroleum products from a formation containing heavy crude oil. In one embodiment, a method includes flowing a catalytic material containing the nanocatalyst into the formation containing the heavy crude oil and exposing the heavy crude oil and the catalytic material to a reducing agent (e.g., $H_2$). The method further includes positioning a steam generator within the formation, generating and releasing steam from the steam generator to heat the heavy crude oil containing the catalytic material, forming lighter oil products within the formation, and extracting the lighter oil products from the formation. In another embodiment, a method includes exposing the heavy crude oil and the catalytic material to an oxidizing agent (e.g., $O_2$). The nanocatalyst may contain cobalt, iron, nickel, molybdenum, chromium, tungsten, titanium, oxides thereof, alloys thereof, or combinations thereof.

89 Claims, 6 Drawing Sheets

U.S. PATENT DOCUMENTS

| | | |
|---|---|---|
| 6,016,868 A | 1/2000 | Gregoli et al. |
| 6,019,172 A | 2/2000 | Wellington et al. |
| 6,059,957 A | 5/2000 | Khan et al. |
| 6,269,882 B1 | 8/2001 | Wellington et al. |
| 6,328,104 B1 | 12/2001 | Graue |
| 6,358,040 B1 | 3/2002 | Pfefferle et al. |
| 6,394,791 B2 | 5/2002 | Smith et al. |
| 6,752,623 B2 | 6/2004 | Smith et al. |
| 6,973,968 B2 | 12/2005 | Pfefferle |
| 7,114,566 B2 | 10/2006 | Vinegar et al. |
| 7,343,971 B2 | 3/2008 | Pfefferle |
| 7,497,253 B2 | 3/2009 | Retallick et al. |
| 2005/0239661 A1 | 10/2005 | Pfefferle |
| 2006/0042794 A1 | 3/2006 | Pfefferle |
| 2006/0142149 A1 | 6/2006 | Ma et al. |
| 2006/0254956 A1 | 11/2006 | Khan |
| 2006/0260814 A1 | 11/2006 | Pfefferle |
| 2007/0235186 A1 | 10/2007 | Sierra et al. |
| 2007/0235187 A1 | 10/2007 | Goodman |
| 2008/0083537 A1 | 4/2008 | Klassen et al. |

OTHER PUBLICATIONS

Downhole Steam-Generator Study, vol. 1, Conception and Feasibility Evaluation, Final Report, Sep. 1978-Sep. 1980, Sandia National Labs., Albuquerque, NM, Jun. 1982.

International Search Report and Written Opinion for International Application No. PCT/US 08/51496 dated Nov. 6, 2008.

*Enhancing Activity of Iron-based Catalyst Supported on Carbon Nanoparticles by Adding Nickel and Molybdenum*, Ungula Priyanto, Kinya Sakanishi, Osamu Okuma, and Isao Mochida, *Preprints of Symposia: 220th ACS National Meeting*, Aug. 20-24, 2000, Washington, D.C.; Published Aug. 29, 2000, ACS 2000 Fall (Washington DC) 45(4), pp. 829-833.

Robert M. Schirmer and Rod L. Eson, A Direct-Fired Downhole Steam Generator—From Design to Field Test, Society of Petroleum Engineers, Oct. 1985, pp. 1903-1908.

PROCESS FOR DISPERSING NANOCATALYSTS INTO PETROLEUM-BEARING FORMATIONS

CROSS-REFERENCE TO RELATED APPLICATIONS

This patent application claims benefit to U.S. Ser. No. 60/885,442, filed Jan. 18, 2007, and is a continuation-in-part of U.S. Ser. No. 11/868,707, filed Oct. 8, 2007, which claims benefit of U.S. Ser. No. 60/850,181, filed Oct. 9, 2006, U.S. Ser. No. 60/857,073, filed Nov. 6, 2006, and U.S. Ser. No. 60/885,442, filed Jan. 18, 2007, which are herein incorporated by reference in their entirety.

BACKGROUND OF THE INVENTION

1. Field of the Invention

Embodiments of the invention relates in general to improving the performance of petroleum-bearing formations and, in particular, to an improved system, method, and apparatus for distributing nanocatalysts in petroleum-bearing formations.

2. Description of the Related Art

Vast quantities of heavy oil and bitumen are found in Canada, Venezuela, and the United States. These resources of heavy oil and bitumen are typically characterized by having low specific gravities (0-18° API), high viscosities (>100,000 cp), and high sulfur content (e.g., >5% by weight). As a result, these resources are difficult and expensive to refine into saleable products.

Pyrolysis occurs when oil thermally cracks at temperatures greater than about 650° F. Although pyrolysis reduces the viscosity of oil, sometimes dramatically, it often results in the formation of large quantities of coke. This thermal reaction also causes a desirable increase in the API gravity, but it has little effect on the sulfur and tends to raise the total acid number, which sharply reduces the value of the oil to refiners. To overcome these limitations, it would be helpful to have an in situ process for upgrading the raw material before it is produced from the wells.

Conventional, aftermarket refining provides two alternative types of refining processes for the initial upgrading step: (1) carbon removal (e.g., delayed coking), or (2) hydrogen addition (e.g., hydrogenation). Delayed coking is not well-suited for in situ upgrading because of the high temperatures (e.g., about 900° F.-1,250° F.) and the short reaction times (e.g., about 2-3 hours) required to complete the process.

With regard to hydrogenation, nanocatalysts have been developed for various chemical reactions used in refining applications. Nanocatalysts are beneficial for upgrading, and include alkylation of aromatics over $TiO_2$, isomerization of alkanes over $TiO_2$, dehydrogenation/hydrogenation of C—H bonds over $TiO_2$/Pt, hydrogenation of double bonds over $TiO_2$/Ni, and hydro-desulfurization of thiophene over $TiO_2$/Ni/Mo. However, the stumbling block that prevents the application of these solutions to in situ upgrading is the lack of technique or method to inject the appropriate catalysts (e.g., nanoparticles) and then disperse them throughout a portion of the target reservoir.

Processes for the in situ conversion and recovery of heavy crude oils and natural bitumens from subsurface formations have been described. A mixture of reducing gases, oxidizing gases, and steam are fed to downhole combustion devices located in the injection boreholes. Alternatively, the gas mixture may be provided from the surface. Combustion of the reducing gas-oxidizing gas mixture is carried out to produce high quality wet steam or superheated steam and hot reducing gases for injection into the formation to convert and upgrade the heavy crude or bitumen into lighter hydrocarbons. The excess reducing gas that is not used as fuel is injected into the formation for converting oil in place to less viscous oil and upgrading the tar. Although this solution is beneficial for many applications, it is not suitable for introducing and distributing nanocatalysts in an oil-bearing formation.

SUMMARY OF THE INVENTION

Embodiments of the invention provide methods for recovering petroleum products from a petroleum-bearing formation by distributing nanocatalysts into the petroleum-bearing formation and heating the heavy crude oil therein. In one embodiment, a method for recovering petroleum products from a formation is provided which includes flowing a catalytic material containing a nanocatalyst into the formation containing a heavy crude oil, exposing the heavy crude oil and the catalytic material to a reducing agent, positioning a steam generator within the formation, generating and releasing steam from the steam generator to heat the heavy crude oil containing the catalytic material, forming lighter oil products from the heavy crude oil within the formation, and extracting the lighter oil products from the formation.

In some examples, the nanocatalyst may contain iron, nickel, molybdenum, tungsten, titanium, vanadium, chromium, manganese, cobalt, alloys thereof, oxides thereof, sulfides thereof, derivatives thereof, or combinations thereof. In one example, the nanocatalyst contains iron and another metal, such as nickel and/or molybdenum. In another example, the nanocatalyst contains a cobalt compound and a molybdenum compound. In another example, the nanocatalyst contains a nickel compound and a molybdenum compound. In another example, the nanocatalyst contains tungsten oxide, tungsten sulfide, derivatives thereof, or combinations thereof. The catalytic material may contain the nanocatalyst supported on carbon nanoparticulate or on alumina, silica, molecular sieves, ceramic materials, derivatives thereof, or combinations thereof. The carbon nanoparticulate and the nanocatalysts usually have a diameter of less than 1 μm, such as within a range from about 5 nm to about 500 nm.

In other examples, the heavy crude oil containing the catalytic material may be heated by the steam to a temperature of less than about 600° F., preferably, within a range from about 250° F. to about 580° F., and more preferably, from about 400° F. to about 550° F. The reducing agent may contain a reagent such as hydrogen gas, carbon monoxide, synthetic gas, tetralin, decalin, derivatives thereof, or combinations thereof. In other examples, the catalytic material and the reducing agent are co-flowed into the formation. In one example, the reducing agent contains hydrogen gas, which has a partial pressure of about 100 psi or greater within the formation.

In another example, the steam is generated by combusting oxygen gas and hydrogen gas within the steam generator. The oxygen gas and the hydrogen gas may each be transferred from outside of the formation, through a borehole, and into the formation. In another example, the steam is generated by combusting oxygen gas and a hydrocarbon gas within the steam generator. The oxygen gas and the hydrocarbon gas may each be transferred from outside of the formation, through a borehole, and into the formation. The hydrocarbon gas may contain methane. In other examples, the heavy crude oil and the catalytic material may be exposed to a carrier gas, such as carbon dioxide, to reduce viscosity. Carbon dioxide is soluble in the heavy crude oil thereby reduces the viscosity of the heavy crude oil within the formation. The carbon dioxide may be transferred from outside of the formation, through a borehole, and into the formation. In other examples, the recovered lighter oil products contain a lower concentration of a sulfur impurity than the heavy crude oil. The lighter oil products may contain about 30% by weight less sulfur impurities than the heavy crude oil, preferably, about 50% by weight less sulfur impurities than the heavy crude oil.

In another embodiment, a method for recovering petroleum products from a petroleum-bearing formation is provided which includes flowing a catalytic material containing a nanocatalyst into a formation having a heavy crude oil, exposing the heavy crude oil and the catalytic material to an oxidizing agent, positioning a steam generator within the formation, generating and releasing steam from the steam generator to heat the heavy crude oil containing the catalytic material, forming lighter oil products from the heavy crude oil within the formation, and extracting the lighter oil products from the formation.

In some examples, the nanocatalyst contains titanium, zirconium, aluminum, silicon, oxides thereof, alloys thereof, derivatives thereof, or combinations thereof. In one example, the nanocatalyst contains titanium oxide or derivatives thereof. In other examples, the catalytic material contains the nanocatalyst supported on carbon nanotubes or on alumina, silica, molecular sieves, ceramic materials, derivatives thereof, or combinations thereof.

In other examples, the heavy crude oil containing the catalytic material, that is, the nanocatalyst heavy oil mixture, may be heated by the steam to a temperature of less than about 600° F., preferably, within a range from about 250° F. to about 580° F., and more preferably, from about 400° F. to about 550° F. The oxidizing agent contains a reagent, such as oxygen gas, air, oxygen enriched air, hydrogen peroxide solution, derivatives thereof, or combinations thereof. In some examples, the catalytic material and the oxidizing agent are co-flowed into the formation. In one example, the oxidizing agent contains oxygen gas.

In another embodiment, a method for recovering petroleum products from a petroleum-bearing formation is provided which includes flowing a nanocatalyst and a reducing agent into a formation containing a heavy crude oil, wherein the nanocatalyst and the heavy crude oil form a nanocatalyst heavy oil mixture, positioning a steam generator within the formation, generating and releasing steam from the steam generator to heat the nanocatalyst heavy oil mixture within the formation, forming lighter oil products by hydrogenating the heavy crude oil within the nanocatalyst heavy oil mixture, and extracting the lighter oil products from the formation.

In another embodiment, a method for recovering petroleum products from a petroleum-bearing formation is provided which includes flowing a carrier gas through a first vessel containing a first batch of a catalytic material containing a nanocatalyst within a first vessel, preparing a second batch of the catalytic material within a second vessel, and flowing the catalytic material and the carrier gas from the first vessel and into a formation containing a heavy crude oil, wherein the nanocatalyst and the heavy crude oil form a nanocatalyst heavy oil mixture. The method further includes exposing the nanocatalyst heavy oil mixture to a reducing agent, positioning a steam generator within the formation, generating and releasing steam from the steam generator to heat the nanocatalyst heavy oil mixture within the formation, forming lighter oil products by hydrogenating the heavy crude oil within the nanocatalyst heavy oil mixture, and extracting the lighter oil products from the formation. In one example, the carrier gas contains carbon dioxide, which is exposed to the nanocatalyst heavy oil mixture. The carbon dioxide may be transferred from outside of the formation, through a borehole, and into the formation.

The method may further include preparing the second batch of the catalytic material by combining the nanocatalyst and nanoparticulate within the second vessel. The nanocatalyst may contain at least one metal, such as iron, nickel, molybdenum, tungsten, titanium, vanadium, chromium, manganese, cobalt, alloys thereof, oxides thereof, sulfides thereof, derivatives thereof, or combinations thereof. In some examples, the nanoparticulate may contain carbon, alumina, silica, molecular sieves, ceramic materials, derivatives thereof, or combinations thereof. The nanoparticulate has a diameter of less than 1 μm, preferably, within a range from about 5 nm to about 500 nm.

In another embodiment, a method for recovering petroleum products from a petroleum-bearing formation is provided which includes flowing a nanocatalyst and a reducing agent into a formation containing a heavy crude oil, wherein the nanocatalyst and the heavy crude oil form a nanocatalyst heavy oil mixture, heating the nanocatalyst heavy oil mixture within the formation to a temperature of less than about 600° F., forming lighter oil products by hydrogenating the heavy crude oil within the nanocatalyst heavy oil mixture, and extracting the lighter oil products from the formation.

In some examples, the nanocatalyst heavy oil mixture may be heated within the formation by flowing heated gas, liquid, or fluid from outside of the formation, through a borehole, and into the formation while exposing the nanocatalyst heavy oil mixture. In one example, the nanocatalyst heavy oil mixture is exposed to heated water, steam, or combinations thereof. In other examples, the nanocatalyst heavy oil mixture is heated within the formation by at least one electric heater positioned within the formation. In other examples, the method further includes heating the nanocatalyst heavy oil mixture within the formation by positioning a steam generator within the formation, and generating and releasing steam from the steam generator to heat the nanocatalyst heavy oil mixture within the formation. The temperature may be within a range from about 250° F. to about 580° F., preferably, within a range from about 400° F. to about 550° F.

BRIEF DESCRIPTION OF THE DRAWINGS

So that the manner in which the features and advantages of the invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION

Although the following detailed description contains many specific details for purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations thereon, the present invention.

Figure 1:
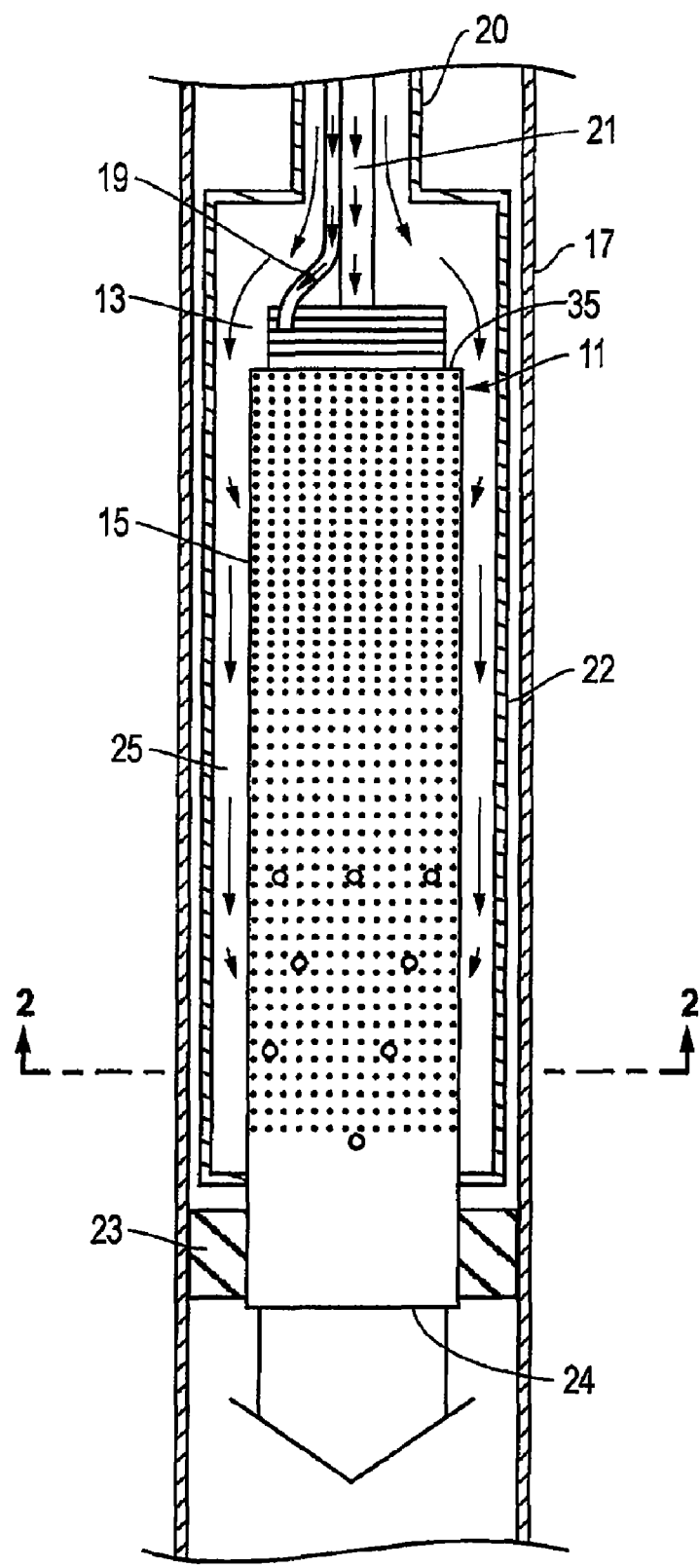
FIG. 1 depicts a side view of a downhole burner positioned in a well having a casing and packer shown in sectional view taken along the longitudinal axis of the casing in accordance with an embodiment described herein.

FIG. 1 depicts a downhole burner 11 positioned in a well according to an embodiment of the invention. The well may contain various wellbore configurations including, for example, vertical, horizontal, SAGD, or various combinations thereof. One skilled in the art will recognize that the burner also functions as a heater for heating the fluids entering the formation. A casing 17 and a packer 23 are shown in cross-section taken along the longitudinal axis of casing 17. Downhole burner 11 includes an injector 13 and a cooling liner 15 containing a hollow cylindrical sleeve. A fuel line 19 and an oxidizer line 21 are connected to and in fluid communication with injector 13.

A separate $CO_2$ line also may be utilized. The $CO_2$ may be injected at various and/or multiple locations along the liner, including at the head end, through the liner 15 or injector 13, or at the exit prior to the packer 23, depending on the application. In the one embodiment, burner 11 is enclosed within an outer shell or burner casing 22.

The burner 11 may be suspended by fuel line 19, oxidizer line 21 and steam line 20 while being lowered down the well. In another embodiment, a shroud or string of tubing (neither shown) may suspend burner 11 by attaching to injector 13 and/or cooling liner 15. When installed, burner 11 could be supported on packer 23 or casing 17. In one embodiment, burner casing 22 and burner 11 form an annular steam channel 25, which substantially surrounds the exterior surfaces of injector 13 and cooling liner 15.

In operation, steam having a preferable steam quality of within a range from about 50% to about 100%, or some degree of superheated steam, may be formed at the surface of a well and fluidly communicated to steam channel 25 at a pressure of, for example, about 1,600 psi. The steam arriving in steam channel 25 may have a steam quality of about 40% to about 90% due to heat loss during transportation down the well. In one embodiment, burner 11 has a power output of about 13 MMBTU/hr and is designed to produce about 3,200 bpd (barrels per day) of superheated steam (cold water equivalent) with an outlet temperature of around 700° F. at full load. Steam at lower temperatures may also be feasible.

Steam communicated to burner 11 through steam channel 25 may enter burner 11 through a plurality of holes in cooling liner 15. Combustion occurring within cooling liner 15 heats the steam and increases its steam quality. The heated, high-quality steam and combustion products exit burner 11 through outlet 24. The steam and combustion products (e.g., the combusted fuel and oxidizer (e.g., products) or exhaust gases) then may enter an oil-bearing formation in order to, for example, upgrade and improve the mobility of heavy crude oils held in the formation. Those skilled in the art will recognize that burners having the design of burner 11 may be built to have almost any power output, and to provide almost any steam output and steam quality.

Figure 2:
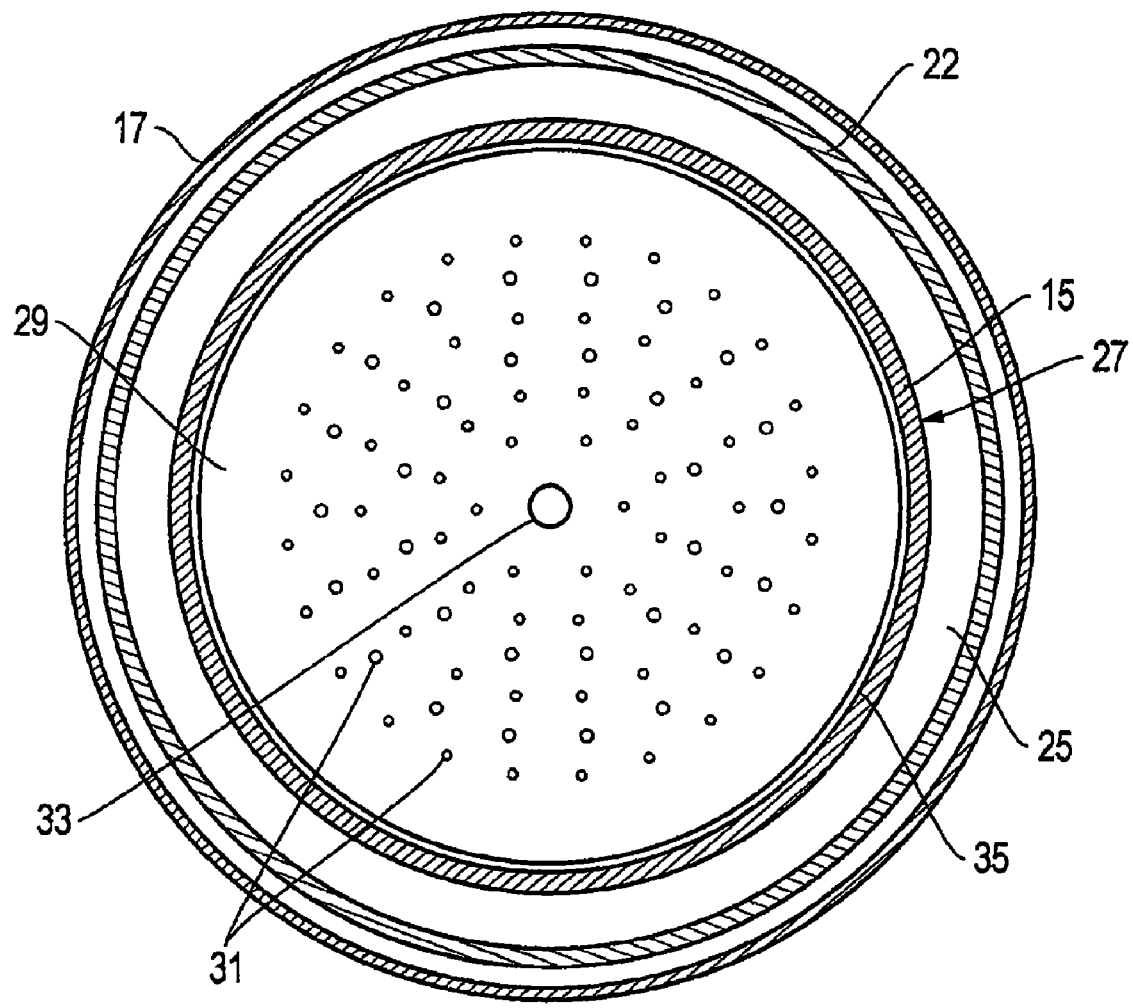
FIG. 2 depicts a bottom sectional view of the assembly of FIG. 1 taken along line 2-2 of FIG. 1 in accordance with an embodiment described herein.

FIG. 2 depicts an upward view of the downhole burner of FIG. 1. Steam channel 25 is formed between burner casing 22 and cooling liner wall 27 of cooling liner 15. Injector face plate 29 of injector 13 (see FIG. 1) has formed therein a plurality of injection holes 31 for the injection of fuel and oxidizer into the burner. Injector face plate 29 further includes an igniter 33 for igniting fuel and oxidizer injected into the burner. Igniter 33 could be a variety of devices and it could be a catalytic device. A small gap 35 may be provided between injector face plate 29 and cooling liner wall 27 so that steam can leak past and cool injector face plate 29.

Embodiments of the invention are suitable for many different types and sizes of wells. For example, in one embodiment designed for use in a well having a well casing diameter of 7⅝-inches, burner casing 22 has an outer diameter of 6 inches and a wall thickness of 0.125 inches; cooling liner wall 27 has an outer diameter of 5 inches, an inner diameter of 4.75 inches, and a wall thickness of 0.125 inches; injector face plate 29 has a diameter of 4.65 inches; steam channel 25 has an annular width between cooling liner wall 27 and burner casing 22 of 0.375 inches; and gap 35 has a width of 0.050 inches.

Figure 11:
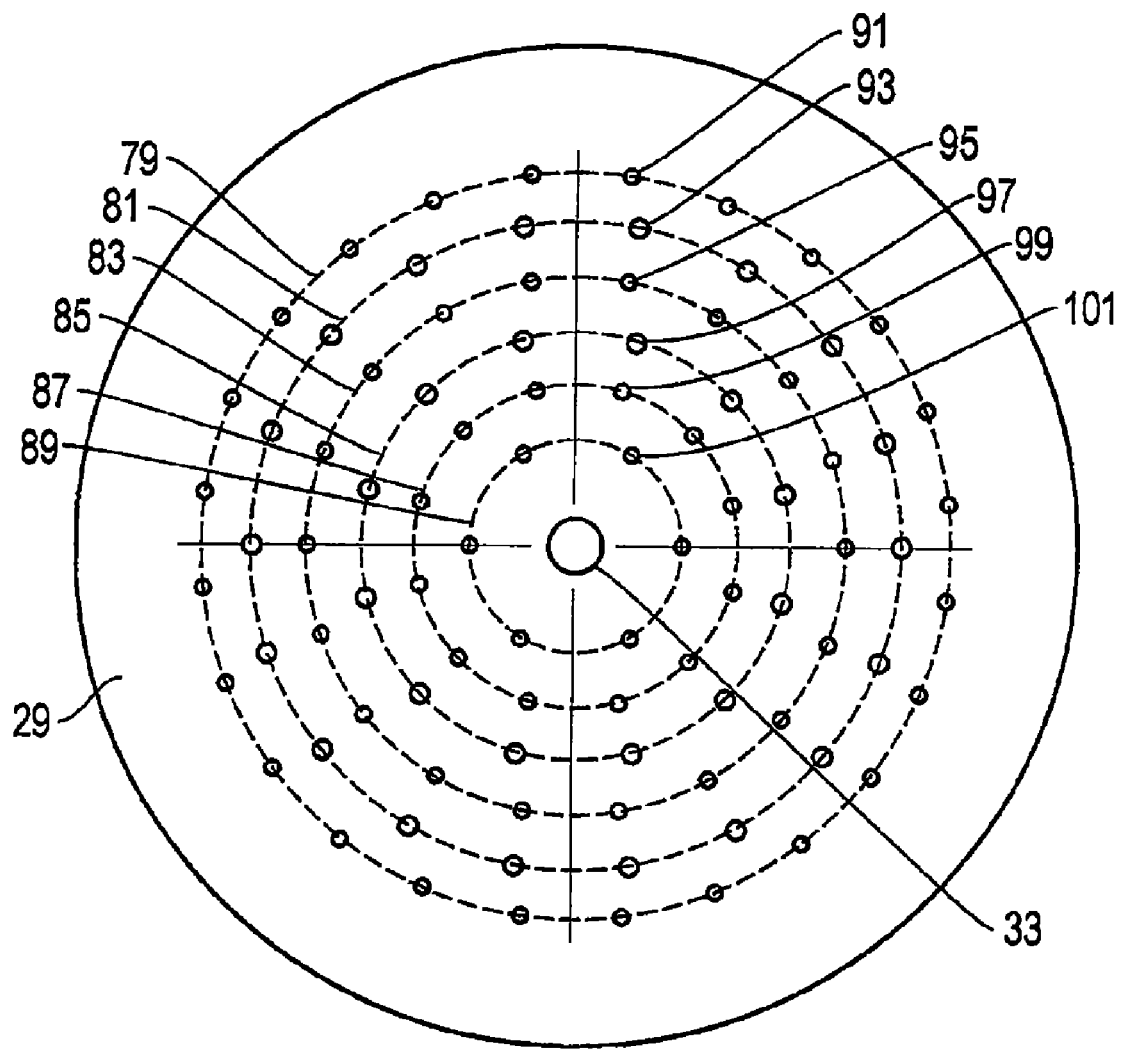
FIG. 11 depicts a bottom view of an injector face plate constructed in accordance with another embodiment described herein.

FIG. 11 illustrates one embodiment of the injector face plate 29. Injector face plate 29 forms part of injector 13 and includes igniter 33. Fuel holes 93, 97 may be arranged in concentric rings 81, 85. Oxidizer holes 91, 95, 99, 101 also may be arranged in concentric rings 79, 83, 87, 89. Fuel holes 93, 97 and oxidizer holes 91, 95, 99, 101 correspond to injection holes 31 of FIG. 2. In one embodiment, concentric ring 79 has a radius of 1.75 inches, concentric ring 81 has a radius of 1.50 inches, concentric ring 83 has a radius of 1.25 inches, concentric ring 85 has a radius of 1.00 inches, concentric ring 87 has a radius of 0.75 inches, and concentric ring 89 has a radius of 0.50 inches. In one embodiment, oxidizer holes 91 have a diameter of 0.056 inches, oxidizer holes 95 have a diameter of 0.055 inches, oxidizer holes 99 have a diameter of 0.052 inches, oxidizer holes 101 have a diameter of 0.060 inches, and fuel holes 93, 97 have a diameter of 0.075 inches.

In one embodiment, fuel holes 93, 97 and oxidizer holes 91, 95, 99, 101 produce a shower head stream pattern of fuel and oxidizer rather than an impinging stream pattern or a fogging effect. Although other designs may be used and are within the scope of embodiments herein, a shower head design moves the streams of fuel and oxidizer farther away from injector face plate 29. This provides a longer stand-off distance between the high flame temperature of the combusting fuel and injector face plate 29, which in turn helps to keep injector face plate 29 cooler.

Figure 3:
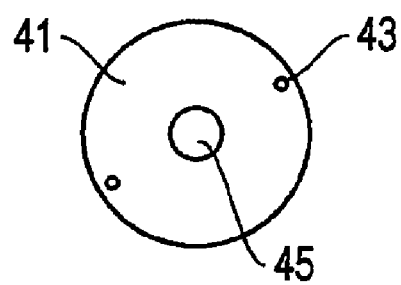
FIG. 3 depicts a plan view of a cover plate in accordance with another embodiment described herein.
Figure 4:
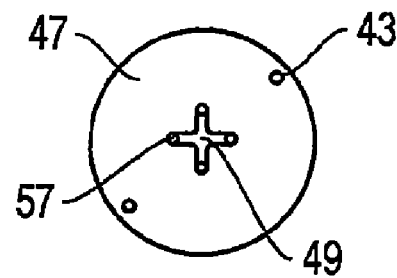
FIG. 4 depicts a plan view of an oxidizer distribution manifold plate in accordance with another embodiment described herein.

FIG. 3 shows a cover plate 41 in accordance with an embodiment of the invention. Cover plate 41 forms part of injector 13 and may include oxidizer inlet 45 and alignment holes 43. FIG. 4 shows an oxidizer distribution manifold plate 47 according to an embodiment of the invention. Oxidizer distribution manifold plate 47 forms part of injector 13 and may include oxidizer manifold 49, oxidizer holes 51, and alignment holes 43.

Figure 5:
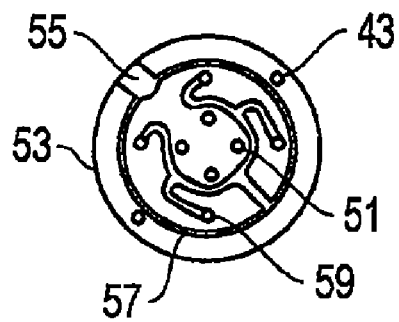
FIG. 5 depicts a plan view of a fuel distribution manifold plate in accordance with another embodiment described herein.

FIG. 5 shows a fuel distribution manifold plate 53 according to an embodiment of the invention. Fuel distribution manifold plate 53 forms part of injector 13 and may include oxidizer holes 51 and alignment holes 43. Fuel distribution manifold plate 53 also may include fuel inlet 55, fuel manifold or passages 57, and fuel holes 59. Fuel manifold 57 may be formed to route fuel throughout the interior of fuel distribution manifold plate 53 as a means of cooling the plate.

Figure 6:
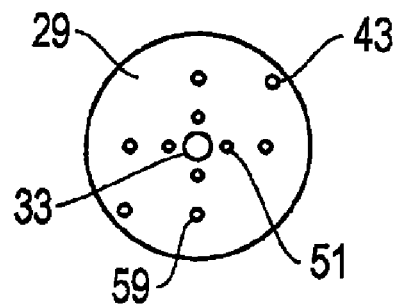
FIG. 6 depicts a plan view of an injector face plate in accordance with another embodiment described herein.

FIG. 6 shows an injector face plate 29 according to an embodiment of the invention. Injector face plate 29 forms part of injector 13 and may include oxidizer holes 51, fuel holes 59, and alignment holes 43. Oxidizer holes 51 of FIG. 6 correspond to oxidizer holes 91, 95, 99, 101 of FIG. 11 and fuel holes 59 of FIG. 6 correspond to fuel holes 93, 97 of FIG. 11.

Figure 7:
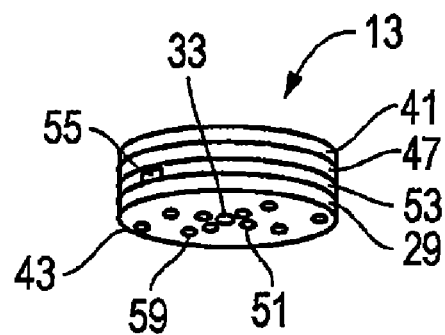
FIG. 7 depicts a lower isometric view of an injector in accordance with another embodiment described herein.

FIG. 7 depicts the assembled components of the injector 13 according to one embodiment of the invention. Injector 13 may be formed by the plates of FIGS. 3-6, with the alignment holes 43 located in each plate arranged in alignment. More specifically, injector 13 may be formed by stacking cover plate 41 on top of oxidizer distribution manifold plate 47, which is stacked on top of fuel distribution manifold plate 53, which is stacked on top of injector face plate 29. As shown in the drawing, alignment holes 43, oxidizer holes 51, and fuel holes 59 are visible on the exterior, or bottom, side of injector face plate 29. Fuel inlet 55 of fuel distribution manifold plate 53 also is visible on the side of injector 13. A pin may be inserted through alignment holes 43 to secure plates 29, 41, 47, 53 in alignment. Injector 13 and the plates forming injector 13 have been simplified in FIGS. 3-7 to better illustrate the relationship of the plates and the design of the injector. Commercial embodiments of injector 13 may include a greater number of oxidizer and fuel holes, and may include plates that are relatively thinner than those shown in FIGS. 3-7.

Figure 8:
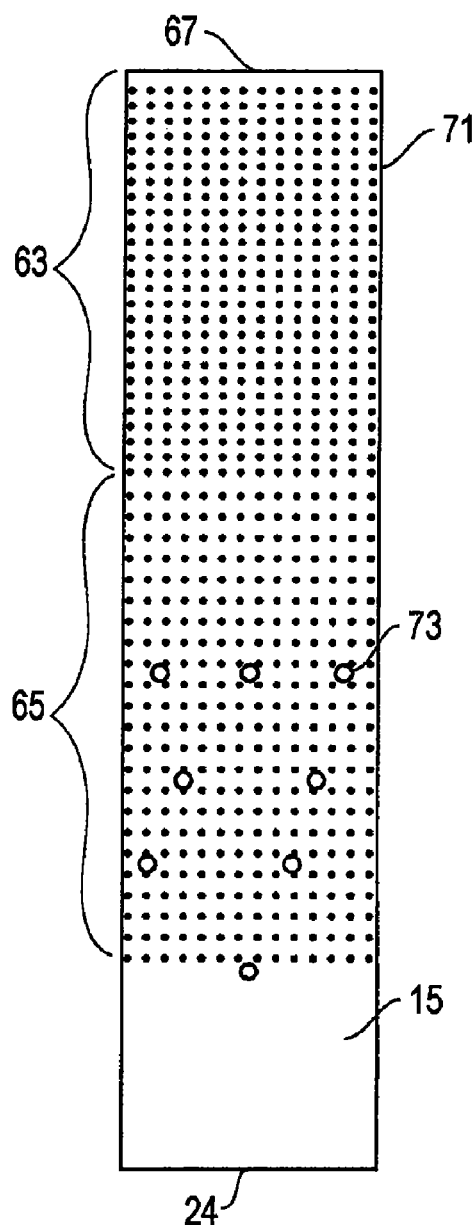
FIG. 8 depicts a side view of a cooling liner in accordance with another embodiment described herein.

FIG. 8 illustrates one embodiment of the cooling liner 15. The cooling liner 15 forms part of burner 11 as shown in FIG. 1. Injector 13 may be positioned at the inlet, or upper end, 67 of cooling liner 15. Cooling liner 15 includes effusion cooling section 63 and effusion cooling and jet mixing section 65. In a one embodiment, section 63 extends for about 7.5 inches from the bottom of injector 13 and section 65 extends for about 10 inches from the bottom of section 63. Those skilled in the art will recognize that other lengths for sections 63, 65 are within the scope of embodiments herein. Heated steam and combustion products exit cooling liner 15 through outlet 24.

Figure 9:
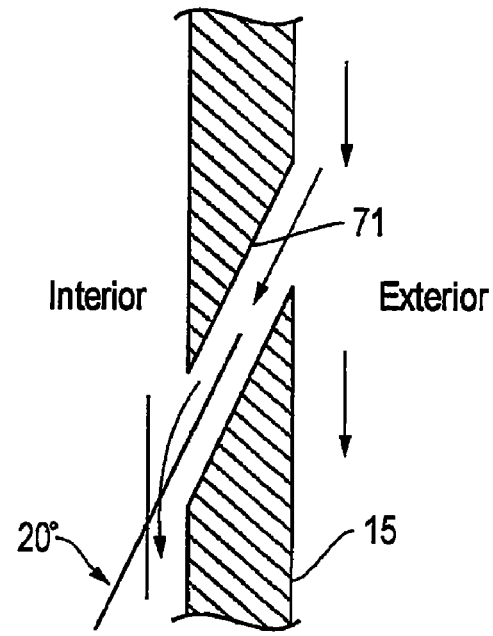
FIG. 9 depicts an enlarged sectional side view of a portion of the cooling liner containing effusion holes, as illustrated in FIG. 8, in accordance with another embodiment described herein.

Effusion cooling section 63 may be characterized by the inclusion of a plurality of effusion holes 71. Effusion cooling section 63 acts to inject small jets of steam along the surface of cooling liner 15, thus providing a layer of cooler gases to protect liner 15. In one embodiment, effusion holes 71 may be angled 20 degrees off of an internal surface of cooling liner 15 and aimed downstream of inlet 67, as shown in FIG. 9. Angling of effusion holes 71 helps to prevent steam from penetrating too far into burner 11 and allows the steam to move along the walls of liner 15 to keep it cool. The position of effusion cooling section 63 may correspond to the location of the flame position in burner 11. In one embodiment, about 37.5% of the steam provided to burner 11 through steam channel 25 (FIG. 1) is injected by effusion cooling section 63.

Figure 10:
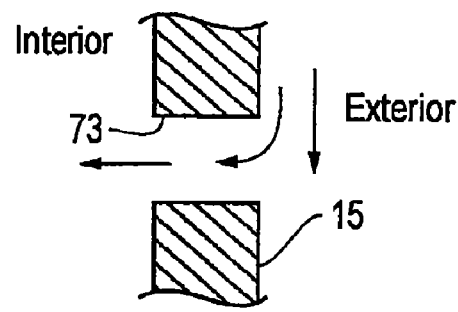
FIG. 10 depicts an enlarged sectional side view of a portion of the cooling liner of FIG. 8 illustrating a mixing hole therein, in accordance with another embodiment described herein.

Effusion cooling and jet mixing section 65 may be characterized by the inclusion of a plurality of effusion holes 71 as well as a plurality of mixing holes 73. Mixing holes 73 are larger than effusion holes 71, as shown in FIG. 10. Furthermore, mixing holes 73 may be set at a 90 degree angle off of an internal surface of cooling liner 15. Effusion holes 71 act to cool liner 15 by directing steam along the wall of liner 15, while mixing holes 73 act to inject steam further toward the central axial portions of burner 11.

In another embodiment, the process further includes injecting liquid water into the downhole burner and cooling the injector and/or liner with the water. The water may be introduced to the well and injected in numerous ways such as those described herein.

Table 1 summarizes the qualities and placement of the holes of sections 63, 65 in one embodiment. The first column defines the section of cooling liner 15 and the second column describes the type of hole. The third and fourth columns describe the starting and ending position of the occurrence of the holes in relation to the top of section 63, which may correspond to the bottom surface of injector 13 (see FIG. 1). The fifth column shows the percentage of total steam that is injected through each group of holes. The sixth column includes the number of holes while the seventh column describes the angle of injection. The eighth column shows the maximum percentage of jet penetration of the steam relative to the internal radius of cooling liner 15. The ninth column shows the diameter of the holes in each group.

TABLE 1

Example of Cooling Liner Properties

| Section | Hole Type | Start (inches) | End (inches) | % of Total Steam | Number of Holes | Injection Angle (degrees) | Radial Injection % | Hole Diameter (inches) |
|---|---|---|---|---|---|---|---|---|
| Effusion Cooling | Effusion | 0.00 | 3.00 | 15 | 720 | 20.0 | 3.90 | 0.0305 |
| | Effusion | 3.00 | 5.00 | 12.5 | 600 | 20.0 | 8.16 | 0.0305 |
| | Effusion | 5.00 | 7.50 | 10 | 480 | 20.0 | 6.81 | 0.0305 |
| Effusion Cooling and Jet Mixing | Mixing | 7.50 | 7.50 | 6.5 | 18 | 90.0 | 74.35 | 0.1268 |
| | Effusion | 7.50 | 9.50 | 4.8 | 180 | 20.0 | 6.39 | 0.0345 |
| | Mixing | 9.50 | 9.50 | 6.5 | 12 | 90.0 | 75.94 | 0.1553 |
| | Effusion | 9.50 | 11.50 | 4.8 | 180 | 20.0 | 5.39 | 0.0345 |
| | Mixing | 11.50 | 11.50 | 6.5 | 8 | 90.0 | 79.68 | 0.1902 |
| | Effusion | 11.50 | 13.50 | 4.8 | 180 | 20.0 | 4.66 | 0.0345 |

TABLE 1-continued

Example of Cooling Liner Properties

| Section | Hole Type | Start (inches) | End (inches) | % of Total Steam | Number of Holes | Injection Angle (degrees) | Radial Injection % | Hole Diameter (inches) |
|---|---|---|---|---|---|---|---|---|
| | Mixing | 13.50 | 13.50 | 6.5 | 6 | 90.0 | 80.43 | 0.2196 |
| | Effusion | 13.50 | 15.50 | 4.8 | 180 | 20.0 | 4.10 | 0.0345 |
| | Mixing | 15.50 | 15.50 | 6.5 | 5 | 90.0 | 78.24 | 0.2406 |
| | Effusion | 15.50 | 17.50 | 4.8 | 180 | 20.0 | 3.66 | 0.0345 |
| | Mixing | 17.50 | 17.50 | 6 | 4 | 90.0 | 75.93 | 0.2584 |

Embodiments of the downhole burner may be operated using various fuels. In one embodiment, the burner may be fueled by hydrogen, methane, natural gas, or syngas. One type of syngas composition contains 44.65 mole % CO, 47.56 mole % $H_2$, 6.80 mole % $CO_2$, 0.37 mole % $CH_4$, 0.12 mole % Ar, 0.29 mole % $N_2$, and 0.21 mole % $H_2S+COS$. One embodiment of the oxidizer for all the fuels includes oxygen and could be, for example, air, rich air, or pure oxygen. Although other temperatures may be employed, an inlet temperature for the fuel is about 240° F. and an inlet temperature for the oxidant is about 186.5° F.

Table 2 summarizes the operating parameters of one embodiment of a downhole burner that is similar to that described in FIGS. 1-11. The listed parameters are considered separately for a downhole burner operating on hydrogen, syngas, natural gas, and methane fuels. Other fuels, such as liquid fuels, could be used.

TABLE 2

Downhole burner producing about 3200 bpd of steam

| Parameter | Units | $H_2$—$O_2$ | Syngas-$O_2$ | $CH_4$—$O_2$ |
|---|---|---|---|---|
| Power Required | MMBTU/hr | 13.0 | 13.0 | 13.0 |
| Fuel | | | | |
| Mass Flow | lb/hr | 376 | 3224 | 985 |
| Inlet Pressure | psi | 1610 | 1680 | 1608 |
| Hole Diameter | inches | 0.075 | 0.075 | 0.075 |
| Number of Holes | | 30 | 30 | 30 |
| Oxidizer | | | | |
| Mass Flow | lb/hr | 3011 | 2905 | 3939 |
| Inlet Pressure | psi | 1629 | 1626 | 1648 |
| Average Hole Diameter | inches | 0.055 | 0.055 | 0.055 |
| Number of Holes | | 60 | 60 | 60 |

Embodiments of the downhole burner also may be operated using $CO_2$ as a coolant in addition to steam. $CO_2$ may be injected through the injector or through the cooling liner. The power required to heat the steam increases when diluents such as $CO_2$ are added. In the example of Table 3, a quantity of $CO_2$ sufficient to result in 20 volumetric percent of $CO_2$ in the exhaust stream of the burner is added downstream of the injector. It can be seen that the increase in inlet pressures is minimal although the required power has increased.

TABLE 3

Downhole burner producing 3,200 bpd of steam and 20 volumetric percent $CO_2$. $CO_2$ is added downstream of injector.

| Parameter | Units | $H_2$—$O_2$ | Syngas-$O_2$ | $CH_4$—$O_2$ |
|---|---|---|---|---|
| Power Required | MMBTU/hr | 14.7 | 14.1 | 14.3 |
| Fuel | | | | |
| Mass Flow | lb/hr | 427 | 3496 | 1084 |
| Inlet Pressure | psi | 1614 | 1699 | 1610 |
| Hole Diameter | inches | 0.075 | 0.075 | 0.075 |
| Number of Holes | | 30 | 30 | 30 |
| Oxidizer | | | | |
| Mass Flow | lb/hr | 3413 | 3149 | 4335 |
| Inlet Pressure | psi | 1637 | 1630 | 1658 |
| Average Hole Diameter | inches | 0.055 | 0.055 | 0.055 |
| Number of Holes | | 60 | 60 | 60 |

In the example of Table 4, a quantity of $CO_2$ sufficient to result in 20 volumetric percent of $CO_2$ in the exhaust stream of the burner has been added through the fuel line and fuel holes of the burner. It can be seen that the fuel inlet pressure is much higher than in the example of Table 3. $CO_2$ also could be delivered through the oxidizer line and oxidizer holes, or a combination of delivery methods could be used. For example, the $CO_2$ could be delivered into burner 11 with the fuel.

In other embodiments, the diameters of the fuel and oxidizer injectors 31 may differ to optimize the injector plate for a particular set of conditions. In the present embodiment, the diameters are adequate for the given conditions, assuming that supply pressure on the surface is increased when necessary.

TABLE 4

Downhole burner producing 3,200 bpd of steam and 20 volumetric percent $CO_2$. $CO_2$ is added through the fuel line and fuel holes.

| Parameter | Units | $H_2$—$O_2$ | Syngas-$O_2$ | $CH_4$—$O_2$ |
|---|---|---|---|---|
| Diluent/Fuel Mass Ratio | | 29.68 | 2.14 | 8.67 |
| Percent Diluent in Fuel Line | | 100 | 100 | 100 |
| Percent Diluent in Oxidizer Line | | 0 | 0 | 0 |
| Power Required | MMBTU/hr | 14.7 | 14.1 | 14.3 |

TABLE 4-continued

Downhole burner producing 3,200 bpd of steam and 20 volumetric percent $CO_2$. $CO_2$ is added through the fuel line and fuel holes.

| Parameter | Units | $H_2$—$O_2$ | Syngas-$O_2$ | $CH_4$—$O_2$ |
|---|---|---|---|---|
| Fuel | | | | |
| Mass Flow | lb/hr | 427 | 3496 | 1084 |
| Inlet Pressure | psi | 2416 | 2216 | 1988 |
| Hole Diameter | inches | 0.075 | 0.075 | 0.075 |
| Number of Holes | | 30 | 30 | 30 |
| Oxidizer | | | | |
| Mass Flow | lb/hr | 3413 | 3149 | 4335 |
| Inlet Pressure | psi | 1637 | 1630 | 1658 |
| Average Hole Diameter | inches | 0.055 | 0.055 | 0.055 |
| Number of Holes | | 60 | 60 | 60 |

Burner 11 can be useful in numerous operations in several environments. For example, burner 11 can be used for the recovery of heavy oil, tar sands, shale oil, bitumen, and methane hydrates. Such operations with burner 11 are envisioned in situ under tundra, in land-based wells, and under water, such as gulfs, seas, or oceans.

Embodiments of the invention have numerous advantages. The dual purpose cooling/mixing liner maintains low wall temperatures and stresses, and mixes coolants with the combustion effluent. The head end section of the liner is used for transpiration cooling of the line through the use of effusion holes angled downstream of the injector plate. This allows for coolant (primarily partially saturated steam at about 70% to 80% steam quality) to be injected along the walls, which maintains low temperatures and stress levels along liner walls, and maintains flow along the walls and out of the combustion zone to prevent flame extinguishment.

The back end section of the liner provides jet mixing of steam (and other coolants) for the combustion effluent. The pressure difference across the liner provides sufficient jet penetration through larger mixing holes to mix coolants into the main burner flow, and superheat the coolant steam. The staggered hole pattern with varying sizes and multiple axial distances promotes good mixing of the coolant and combustion effluent prior to exhaust into the formation. A secondary use of transpiration cooling of the liner is accomplished through use of effusion holes angled downstream of the combustion zone to maintain low temperatures and stress level along liner walls in jet mixing section of the burner similar to transpiration cooling used in the head end section.

Embodiments of the invention further provide coolant flexibility such that the liner can be used in current or modified embodiment with various vapor/gaseous phase coolants, including but not limited to oil production enhancing coolants, in addition to the primary coolant, steam. The liner maintains effectiveness as both a cooling and mixing component when additional coolants are used.

The showerhead injector uses alternating rings of axial fuel and oxidizer jets to provide a uniform stable diffusion flame zone at multiple pressures and turndown flow rates. It is designed to keep the flame zone away from injector face to prevent overheating of the injector plate. The injector has flexibility to be used with multiple fuels and oxidizers, such as hydrogen, natural gases of various compositions, and syngases of various compositions, as well as mixtures of these primary fuels. The oxidizers include oxygen (e.g., about 90%-95% purity) as well as air and "oxygen-rich" air for appropriate applications. The oil production enhancing coolants (e.g., carbon dioxide) can be mixed with the fuel and injected through the injector plate.

Catalytic Material Containing Nanocatalyst

Embodiments of the invention provide methods for recovering petroleum products from a petroleum-bearing formation by distributing nanocatalysts into the petroleum-bearing formation and heating the heavy crude oil therein. In some embodiments, a method is provided which includes flowing a catalytic material containing a nanocatalyst into a formation having a heavy crude oil, exposing the heavy crude oil and the catalytic material to a reducing agent (e.g., $H_2$) or an oxidizing agent (e.g., $O_2$), positioning a steam generator within the formation, generating and releasing steam from the steam generator to heat the heavy crude oil containing the catalytic material, forming lighter oil products from the heavy crude oil within the formation, and extracting the lighter oil products from the formation.

The method may be used to disperse nanocatalysts into heavy crude oil and/or bitumen-bearing formations under conditions of time, temperature, and pressure that cause refining reactions to occur, such as those described herein. The nanocatalysts may be injected into the exhaust gas downstream from the outlet or tailpipe of the burner via a conduit or pipe, including an optional separate line. The appropriate catalyst causes the reactions to take place at a temperature that is lower than the temperature of thermal (e.g., non-catalytic) reactions. Advantageously, less coke is formed at the lower temperature. In one embodiment, a recovery process utilizing nanocatalyst as described herein may decrease the process temperature by about 50° F. or greater, preferably, about 100° F. or greater, and more preferably, about 200° F. or greater, than a similar thermal recovery process not utilizing catalyst within the same formation.

The heavy crude oil containing the catalytic material and contained within the formation may be heated to form lighter oil products by hydrogenating the heavy crude oil and extracting the lighter oil products from the formation. The heavy crude oil containing the catalytic material and contained within the formation may be heated to a temperature of less than about 600° F., preferably, within a range from about 250° F. to about 580° F., and more preferably, from about 400° F. to about 550° F. In one example, the nanocatalyst heavy oil mixture may be heated by steam produced from a downhole steam generator positioned within the formation. In another example, the nanocatalyst heavy oil mixture may be heated by steam produced above ground, flowed through the borehole, and exposed to the nanocatalyst heavy oil mixture within the formation. In another example, the nanocatalyst heavy oil mixture may be heated by at least one electric heater positioned within the formation and in physical or thermal contact with the nanocatalyst heavy oil mixture.

In another embodiment, the heavy crude oil within the formation is desulfurized and the resulting recovered lighter oil products contain a lower concentration of a sulfur impurity than the heavy crude oil. Usually, heavy crude oil found within formations may have a sulfur impurity concentration within a range from about 2% to about 9% by weight. However, the catalytic processes described herein may be performed within formations to produce lighter oil products having a sulfur impurity concentration reduced by about 10%, preferably, about 30%, and more preferably, about 50% by weight when compared to the sulfur impurity of the heavy crude oil.

The catalytic processes described in embodiments herein are conducted at reduced temperatures thereby reducing the production cost by minimizing the amount of steam that is used downhole. In some embodiments, the catalysts may speed up the hydrogenation and oxidation processes therefore increasing production in less time.

In one embodiment, the heavy crude oil and a hydrogenating catalytic material containing a nanocatalyst may be combined within the formation. The resulting nanocatalyst heavy oil mixture undergoes a catalytic hydrogenation reaction once exposed to heat and a reducing agent or gas. In one example, a nanocatalyst-reducing agent mixture may be added into the formation containing the heavy crude oil before or during the steam generation. The nanocatalyst-reducing agent mixture, once injected into the formation and combined with the heavy crude oil, promotes converting and upgrading the hydrocarbon downhole, in situ, including sulfur reduction. The in situ catalytic treatment process utilizing a reducing agent provides hydrovisbreaking, hydrocracking, hydrodesulfurizing, as well as other hydrotreating processes to the heavy crude oil. The reducing agent or reducing gas may contain hydrogen gas, carbon monoxide, syngas or synthetic gas (e.g., a $H_2/CO$ mixture), tetralin, decalin, derivatives thereof, or combinations thereof. The reducing agent may be gaseous, liquidized, or fluidized within the formation. Generally, the reducing agent may have a partial pressure of about 100 psi or greater within the formation. In one example, the reducing agent contains hydrogen gas, which has a partial pressure of about 100 psi or greater within the formation.

In some examples, the catalytic material and the reducing agent or gas are co-flowed into the formation. In other examples, the catalytic material and a carrier gas are co-flowed into the formation and the reducing agent or gas is separately transferred into the formation. In other examples, the catalytic material, the reducing agent or gas, and a carrier gas are co-flowed into the formation.

The nanocatalyst may contain iron, nickel, molybdenum, tungsten, titanium, vanadium, chromium, manganese, cobalt, alloys thereof, oxides thereof, sulfides thereof, derivatives thereof, or combinations thereof. In one example, the nanocatalyst contains iron and another metal, such as nickel and/or molybdenum. In another example, the nanocatalyst contains a cobalt compound and a molybdenum compound. In another example, the nanocatalyst contains a nickel compound and a molybdenum compound. In another example, the nanocatalyst contains tungsten oxide, tungsten sulfide, derivatives thereof, or combinations thereof. The catalytic material may contain the catalyst supported on nanoparticulate, such as carbon nanoparticles, carbon nanotubes, alumina, silica, molecular sieves, ceramic materials, derivatives thereof, or combinations thereof. The nanoparticulate or the nanocatalysts usually have a diameter of less than 1 µm, such as within a range from about 5 nm to about 500 nm.

One embodiment of the invention employs nanocatalysts prepared in a manner, such as described in *Enhancing Activity of Iron-based Catalyst Supported on Carbon Nanoparticles by Adding Nickel and Molybdenum*, Ungula Priyanto, Kinya Sakanishi, Osamu Okuma, and Isao Mochida, *Preprints of Symposia: 220$^{th}$ ACS National Meeting, Aug. 20-24, 2000, Washington, D.C.* The catalyst may be transported into a petroleum-bearing formation by a carrier gas. The gas is a reducing gas such as hydrogen and the catalyst is designed to promote an in situ reaction between the reducing gas and the oil within the reservoir. In order for the conversion and upgrading reactions to occur in the reservoir, the catalyst, reducing gas, and the heavy oil or bitumen may be in intimate contact at a temperature of at least about 400° F., and at a hydrogen partial pressure of at least about 100 psi. The intimate contact, the desired temperature, and the desired pressure may be brought about by a downhole steam generator, such as described in commonly assigned U.S. Pat. Nos. 6,016,867, 6,016,868, and 6,328,104, which are incorporated herein by reference in their entirety. The steam, nanocatalysts, and unburned reducing gases are forced into the formation by the pressure created by the downhole steam generator. Because the reducing gas may be the carrier for the nanocatalysts, these two components will tend to travel together in the petroleum-bearing formation. Under the requisite heat and pressure, the reducing gas reacts with the heavy oil and bitumen thereby reducing its viscosity, lowering the sulfur impurity concentration, and increasing its API gravity while producing lighter oil products.

In another embodiment, the heavy crude oil and an oxidizing catalytic material containing a nanocatalyst may be combined within the formation. The resulting nanocatalyst heavy oil mixture undergoes a catalytic oxidation reaction once exposed to heat and an oxidizing agent or gas. In one example, a nanocatalyst-oxidizing agent mixture may be added into the formation containing the heavy crude oil before or during the steam generation. The nanocatalyst-oxidizing agent mixture, once injected into the formation and combined with the heavy crude oil, promotes converting and upgrading the hydrocarbon downhole by decreasing the viscosity through an oxidation reaction. The oxidizing agent or oxidizing gas may contain a reagent, such as oxygen gas, air, oxygen enriched air, hydrogen peroxide solution, derivatives thereof, or combinations thereof. In one example, the catalytic material and the oxidizing agent or gas are co-flowed into the formation. In another example, the catalytic material and a carrier gas are co-flowed into the formation and the oxidizing agent or gas is separately transferred into the formation. In another example, the catalytic material, the oxidizing agent or gas, and a carrier gas are co-flowed into the formation.

In another embodiment, the catalytic material containing nanocatalyst is used to decrease the viscosity of the heavy crude oil during a catalytic oxidation process. The nanocatalyst may contain titanium, zirconium, aluminum, silicon, oxides thereof, alloys thereof, derivatives thereof, or combinations thereof. In one example, the nanocatalyst contains titanium oxide or a titanium oxide based material. In other examples, the nanocatalyst contains zirconium oxide, aluminum oxide, silicon oxide, alloys thereof, or combinations thereof. The catalytic material may contain the catalyst supported on nanoparticulate, such as carbon nanoparticles, carbon nanotubes, molecular sieves, alumina, silica, ceramic materials, derivatives thereof, or combinations thereof. The nanoparticulate or the nanocatalysts usually have a diameter of less than 1 µm, such as within a range from about 5 nm to about 500 nm.

A carrier gas may be used to transport the catalytic material containing the nanocatalyst to the heavy crude oil within the formation. The carrier gas may be a single gas or a mixture of gasses and may be any of the aforementioned reducing gases or oxidizing gases. Carrier gases that may be useful during the processes described herein include carbon dioxide, hydrogen, syngas, air, oxygen, oxygen enriched air, carbon monoxide, nitrogen, derivatives thereof, or combinations thereof.

In one example, carbon dioxide is used as a carrier gas and is exposed to the heavy crude oil and the catalytic material during the recovery process. Carbon dioxide is used as an in situ viscosity reducing agent. The carbon dioxide may be transferred from outside of the formation, through a borehole, and into the formation, or alternatively, generated by combusting a hydrocarbon within the formation. In another example, a reducing gas, such as hydrogen gas or carbon monoxide, is used as a carrier gas during the recovery process. Generally, the reducing gas is utilized along with a hydrogenation nanocatalyst. In another example, an oxidizing gas, such as oxygen gas or air, is used as a carrier gas during the recovery process. The oxidizing gas is generally utilized along with an oxidizing nanocatalyst.

In one embodiment, the carrier gas may be preheated on the surface prior to entering the borehole or a transfer vessel. The carrier gas may be preheated using a heat source or heat exchange device. The carrier gas may be preheated to a temperature of up to about 600° F., preferably, from about 450° F. to about 580° F. The preheated gas is supplied to the transfer vessel at an elevated temperature that provides for heat losses in the heat transfer vessel as well as the heavy crude oil within the formation and still be sufficient to maintain the in situ catalytic reactions for which the catalyst was designed.

In another embodiment, the carrier gas is not preheated on the surface prior to entering the borehole or the transfer vessel while not employing a downhole steam generator. One or more electrical heaters may be placed within or at the bottom of the wellbore in order to heat the heavy crude oil in the formation. The carrier gas is heated within the borehole and carries the heat via convection into the formation.

For other types of reactions, the carrier gas is one or more of the reactants. For example, if the reaction that is promoted is in situ combustion, the carrier gas is oxygen, rich air, or air. In another embodiment, carbon dioxide is the carrier gas for a cracking catalyst that promotes in situ cracking of the hydrocarbon in the formation.

In another example, the steam and heat are generated by combusting oxygen gas and hydrogen gas within the steam generator. The oxygen gas and the hydrogen gas may each be transferred from outside of the formation, through a borehole, and into the formation. In another example, the steam, carbon dioxide, and heat are generated by combusting oxygen gas and a hydrocarbon gas within the steam generator. The oxygen gas and the hydrocarbon gas may each be transferred from outside of the formation, through a borehole, and into the formation. The hydrocarbon gas may contain methane.

In some examples, the nanocatalyst heavy oil mixture may be heated within the formation by flowing heated gas, liquid, or fluid from outside of the formation, through a borehole, and into the formation while exposing the nanocatalyst heavy oil mixture. In one example, the nanocatalyst heavy oil mixture is exposed to heated water, steam, or combinations thereof. In other examples, the nanocatalyst heavy oil mixture is heated within the formation by an electric heater positioned within the formation. In other examples, the method further includes heating the nanocatalyst heavy oil mixture within the formation by positioning a steam generator within the formation, and generating and releasing steam from the steam generator to heat the nanocatalyst heavy oil mixture within the formation.

In another embodiment, several interchangeable vessels are used to prepare and disperse the catalytic material. In one example, a carrier gas is used to flow a first batch of a catalytic material from a first vessel and into the formation containing the heavy crude oil where the nanocatalyst and the heavy crude oil form a nanocatalyst heavy oil mixture. Meanwhile, a second batch of the catalytic material is prepared within a second vessel. Once the first vessel is emptied of the catalytic material, the carrier gas is rerouted to flow to the second vessel, and the second batch of the catalytic material is transferred from the second vessel and into the formation containing the heavy crude oil. Additional catalytic material may be prepared in the first vessel or the first vessel may be simply refilled with catalytic material.

Figure 12:
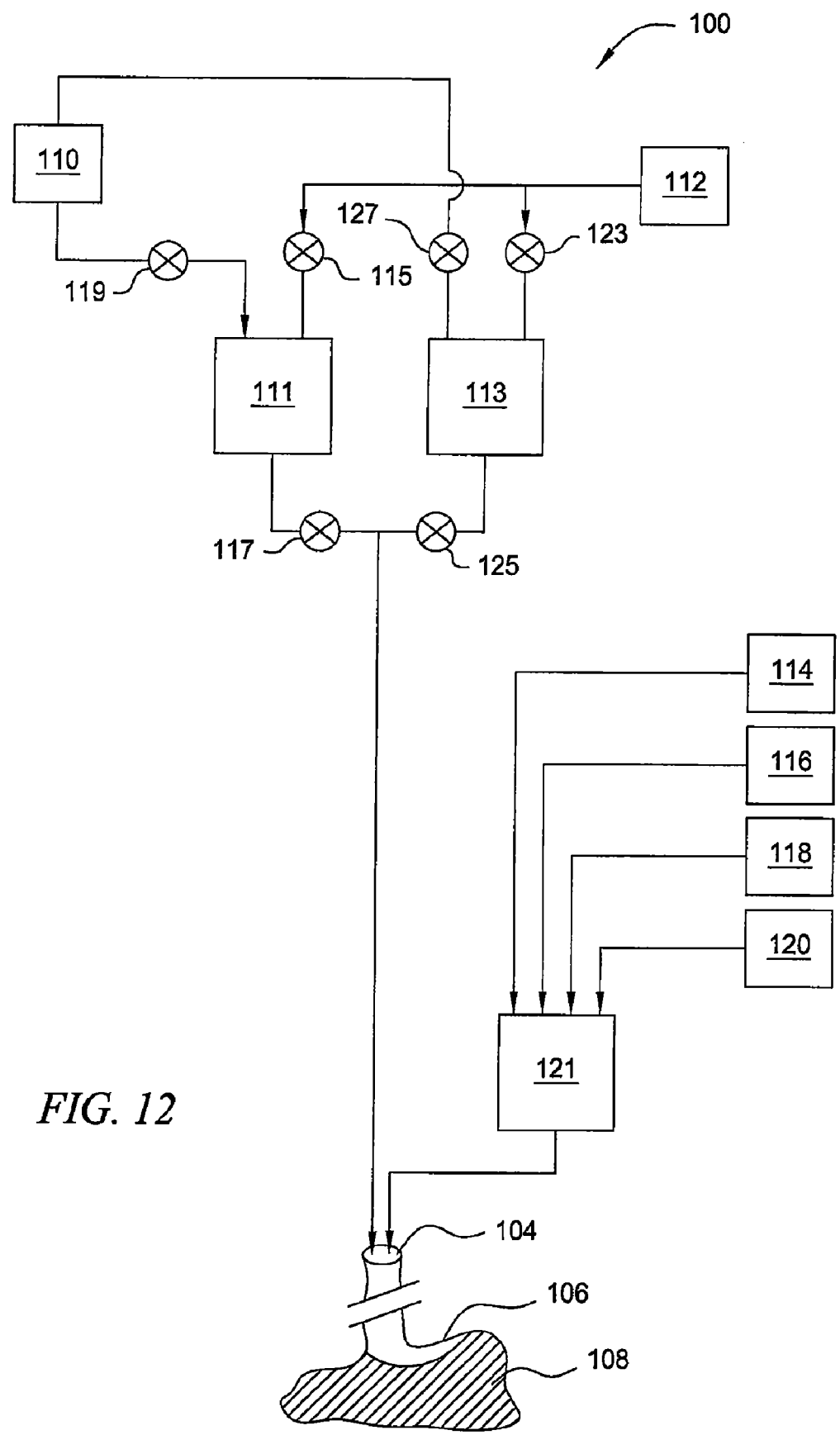
FIG. 12 depicts a schematic diagram of a system for introducing and distributing nanocatalysts in oil-bearing formations, in accordance with another embodiment described herein.

FIG. 12 depicts nanocatalyst system 100 containing vessels 111 and 113 according to another embodiment described herein. Nanocatalyst system 100 may be used to prepare and transport catalytic material containing nanocatalysts. Vessels 111 and 113 may be positioned above ground within the vicinity of borehole 104. Borehole 104 extends through the ground to formation 106 containing heavy crude oil 108 or similar heavy petroleum reserves.

In one example, vessel 111 is in catalyst preparation mode and vessel 113 is in transfer mode. When a catalyst preparation and transfer cycle is complete, the roles of vessels 111 and 113 are reversed. When vessel 111 is in catalyst preparation mode, valves 115 and 117 may be closed. The precursors used to form catalytic materials may be added to vessel 111 through separate ports, conduits, pipes, or lines. For example, vessel 111 may be charged with nanoparticles and a catalyst containing solution or suspension may be transferred from source 110, through valve 119, and into vessel 111. In another example, source 110 contains a solution of dissolved metal salts or compounds that have useful catalytic activity. Thereafter, valve 119 may be closed and the catalyst materials may be mixed, heated, and dried within vessel 111. When the catalyst preparation is complete, valves 115 and 117 are opened and the carrier gas flows from carrier gas source 112, through vessel 111, to carry the nanocatalyst particles through a feedline and into borehole 104. Vessels 111 and 113 may each independently be heated by a heating device, such as an electric heater.

Once vessel 111 is empty of the catalytic material, vessel 111 may be placed in catalyst preparation mode and vessel 113 placed in transfer mode. Valve 127 is closed, valves 123 and 125 are open, and the carrier gas flows from carrier gas source 112, through vessel 113. Valve 127 controls the transfer of catalyst preparation materials (not shown) into vessel 113, to carry the nanocatalyst particles through a feedline and into borehole 104.

Steam generator 121 may be positioned within borehole 104 and used to steam and heat heavy crude oil 108 within formation 106. Steam generator 121 may be coupled to and in fluid communication with carrier gas source 114, reducing agent source 116, oxidizing agent source 118, and steam source 120.

When the cycle of catalyst preparation in one vessel and the catalyst transfer from the other vessel is complete, the roles of the two vessels are reversed. The vessel where the catalyst was prepared becomes the transfer vessel, and the vessel that had the catalyst transferred out becomes the catalyst preparation vessel. This alternation of roles continues until the catalyst injection process is complete, such that the lighter oil products are formed and extracted from the formation.

Some catalysts contain a metal or a metal-containing compound disposed on a carbon nanotube. For those catalysts, the temperature of the upgrading reactions must be below the temperature that allows the steam to react with the carbon nanotubes. Other catalysts, such as titanium oxide or a titanium oxide based material, are not affected by steam and are effective in catalyzing upgrading reactions.

Vessels 111, 113 may operate in parallel to prepare the nanocatalyst and transfer the nanocatalyst to borehole 104. The vessels may be separated from the continuous flow of reducing gas, oxidizing gas, and steam. For example, a nanocatalyst is prepared by impregnating a nickel compound or salt and a molybdenum compound or salt on carbon nanoparticles resulting in a catalyst with about 2% by weight of nickel, about 10% by weight of molybdenum, and about 88% by weight of carbon nanoparticles. One type of carbon nanoparticles that may be used is KETJEN BLACK® nanoparticles, available from Akzo Nobel Chemicals BV. When the batch of catalyst is finished and dried, the carrier gas is passed through the catalyst-containing vessel thereby carrying the catalyst into the injection well and then into the formation. While the catalyst that was prepared in one vessel is being transferred to the lines leading to the injection well, another batch of catalyst is prepared in the other vessel. The alternation of catalyst preparation and transfer is continued in each of the two vessels as long as the in situ process benefits from use of the catalyst.

Recovery processes utilizing nanocatalyst, as described by embodiments herein, provide many advantages to past processes. In one embodiment, the process includes bringing together a reducing agent (e.g., $H_2$), a hydrogenation catalyst, heavy crude oil in place, heat, and pressure, thereby causing catalytic reactions to occur within the reservoir. In another embodiment, the process includes bringing together an oxidizing agent (e.g., $O_2$), an oxidation catalyst, heavy crude oil in place, heat, and pressure, thereby causing catalytic reactions to occur within the reservoir.

Other embodiments provide many opportunities for in situ upgrading of petroleum products since a wide variety of nanocatalysts are available. The nature of catalysts is to promote reactions at milder conditions (e.g., lower temperatures and pressures) than thermal or non-catalytic reactions. Therefore, hydrogenation or oxidation, for example, may be conducted in situ at shallower depths than conventional pyrolysis and other thermal reactions. In one example, the catalytic processes described herein may be performed within formations at a depth within a range from about 500 feet to about 5,000 feet.

Embodiments provide a platform technology that is applicable to a wide range of in situ reactions in a wide range of heavy oil, ultra-heavy oil, natural bitumen, and lighter deposits. The term "heavy crude oil," as used herein, may include heavy oil, ultra-heavy oil, bitumen, as well as other petroleum mixtures displaced underground within formations.

Furthermore, embodiments provide methods that have many applications, including in situ catalytic hydrogenation, in situ catalytic hydrovisbreaking, in situ catalytic hydrocracking, in situ catalytic combustion, in situ catalytic reforming, in situ catalytic alkylation, in situ catalytic isomerization, and other in situ catalytic refining reactions.

While the foregoing is directed to embodiments of the invention, other and further embodiments of the invention may be devised without departing from the basic scope thereof, and the scope thereof is determined by the claims that follow.

The invention claimed is:

1. A method for recovering petroleum products from a petroleum-bearing formation, comprising:
    flowing a catalytic material comprising a nanocatalyst into a formation comprising a heavy crude oil;
    exposing the heavy crude oil and the catalytic material to a reducing agent;
    positioning a steam generator within the formation;
    generating and releasing steam from the steam generator to heat the heavy crude oil comprising the catalytic material;
    forming lighter oil products from the heavy crude oil within the formation; and
    extracting the lighter oil products from the formation.

2. The method of claim 1, wherein the nanocatalyst comprises a metal selected from the group consisting of iron, nickel, molybdenum, tungsten, titanium, vanadium, chromium, manganese, cobalt, alloys thereof, oxides thereof, sulfides thereof, derivatives thereof, and combinations thereof.

3. The method of claim 2, wherein the nanocatalyst comprises iron and a metal selected from the group consisting of nickel, molybdenum, tungsten, titanium, vanadium, chromium, manganese, cobalt, alloys thereof, oxides thereof, sulfides thereof, derivatives thereof, and combinations thereof.

4. The method of claim 3, wherein the nanocatalyst comprises iron, nickel, and molybdenum.

5. The method of claim 2, wherein the nanocatalyst comprises a nickel compound and a molybdenum compound.

6. The method of claim 2, wherein the nanocatalyst comprises a cobalt compound and a molybdenum compound.

7. The method of claim 2, wherein the nanocatalyst comprises tungsten oxide, tungsten sulfide, derivatives thereof, or combinations thereof.

8. The method of claim 2, wherein the catalytic material comprises the nanocatalyst supported on carbon nanoparticulate.

9. The method of claim 8, wherein the carbon nanoparticulate has a diameter of less than 1 μm.

10. The method of claim 9, wherein the diameter is within a range from about 5 nm to about 500 nm.

11. The method of claim 2, wherein the catalytic material comprises the nanocatalyst supported on alumina, silica, molecular sieves, ceramic materials, derivatives thereof, or combinations thereof.

12. The method of claim 1, wherein the heavy crude oil comprising the catalytic material is heated by the steam to a temperature of less than about 600° F.

13. The method of claim 12, wherein the temperature is within a range from about 250° F. to about 580° F.

14. The method of claim 13, wherein the temperature is within a range from about 400° F. to about 550° F.

15. The method of claim 1, wherein the reducing agent comprises a reagent selected from the group consisting of hydrogen gas, carbon monoxide, synthetic gas, tetralin, decalin, derivatives thereof, and combinations thereof.

16. The method of claim 15, wherein the catalytic material and the reducing agent are co-flowed into the formation.

17. The method of claim 16, wherein the reducing agent comprises hydrogen gas.

18. The method of claim 17, wherein the hydrogen gas has a partial pressure of about 100 psi or greater within the formation.

19. The method of claim 1, wherein the steam is generated by combusting oxygen gas and hydrogen gas within the steam generator.

20. The method of claim 19, wherein the oxygen gas and the hydrogen gas are each transferred from outside of the formation, through a borehole, and into the formation.

21. The method of claim 1, wherein the steam is generated by combusting oxygen gas and a hydrocarbon gas within the steam generator.

22. The method of claim 21, wherein the oxygen gas and the hydrocarbon gas are each transferred from outside of the formation, through a borehole, and into the formation.

23. The method of claim 22, wherein the hydrocarbon gas comprises methane.

24. The method of claim 1, further comprising reducing viscosity of the heavy crude oil by exposing the heavy crude oil and the catalytic material to carbon dioxide.

25. The method of claim 24, wherein the carbon dioxide is transferred from outside of the formation, through a borehole, and into the formation.

26. The method of claim 1, wherein the lighter oil products comprise a lower concentration of a sulfur impurity than the heavy crude oil.

27. The method of claim 26, wherein the lighter oil products comprise about 50% by weight or less of the sulfur impurity than the heavy crude oil.

28. The method of claim 27, wherein the lighter oil products comprise about 30% by weight or less of the sulfur impurity than the heavy crude oil.

29. A method for recovering petroleum products from a petroleum-bearing formation, comprising:
  flowing a catalytic material comprising a nanocatalyst into a formation comprising a heavy crude oil;
  exposing the heavy crude oil and the catalytic material to an oxidizing agent;
  positioning a steam generator within the formation;
  generating and releasing steam from the steam generator to heat the heavy crude oil comprising the catalytic material;
  forming lighter oil products from the heavy crude oil within the formation; and
  extracting the lighter oil products from the formation.

30. The method of claim 29, wherein the nanocatalyst comprises a member selected from the group consisting of titanium, zirconium, aluminum, silicon, oxides thereof, alloys thereof, derivatives thereof, and combinations thereof.

31. The method of claim 30, wherein the nanocatalyst comprises titanium oxide.

32. The method of claim 30, wherein the catalytic material comprises the nanocatalyst supported on carbon nanotubes.

33. The method of claim 30, wherein the catalytic material comprises the nanocatalyst supported on alumina, silica, molecular sieves, ceramic materials, derivatives thereof, or combinations thereof.

34. The method of claim 29, wherein the heavy crude oil comprising the catalytic material is heated by the steam to a temperature of less than about 600° F.

35. The method of claim 34, wherein the temperature is within a range from about 250° F. to about 580° F.

36. The method of claim 35, wherein the temperature is within a range from about 400° F. to about 550° F.

37. The method of claim 29, wherein the oxidizing agent comprises a reagent selected from the group consisting of oxygen gas, air, oxygen enriched air, hydrogen peroxide solution, derivatives thereof, and combinations thereof.

38. The method of claim 37, wherein the catalytic material and the oxidizing agent are co-flowed into the formation.

39. The method of claim 38, wherein the oxidizing agent comprises oxygen gas.

40. The method of claim 29, wherein the steam is generated by combusting oxygen gas and hydrogen gas within the steam generator.

41. The method of claim 40, wherein the oxygen gas and the hydrogen gas are each transferred from outside of the formation, through a borehole, and into the formation.

42. The method of claim 29, wherein the steam is generated by combusting oxygen gas and a hydrocarbon gas within the steam generator.

43. The method of claim 42, wherein the oxygen gas and the hydrocarbon gas are each transferred from outside of the formation, through a borehole, and into the formation.

44. The method of claim 43, wherein the hydrocarbon gas comprises methane.

45. The method of claim 29, further comprising reducing viscosity of the heavy crude oil by exposing the heavy crude oil and the catalytic material to carbon dioxide.

46. The method of claim 45, wherein the carbon dioxide is transferred from outside of the formation, through a borehole, and into the formation.

47. The method of claim 29, wherein the lighter oil products comprise a lower concentration of a sulfur impurity than the heavy crude oil.

48. The method of claim 47, wherein the lighter oil products comprise about 50% by weight or less of the sulfur impurity than the heavy crude oil.

49. The method of claim 48, wherein the lighter oil products comprise about 30% by weight or less of the sulfur impurity than the heavy crude oil.

50. A method for recovering petroleum products from a petroleum-bearing formation, comprising:
  flowing a nanocatalyst and a reducing agent into a formation comprising a heavy crude oil, wherein the nanocatalyst and the heavy crude oil form a nanocatalyst heavy oil mixture;
  positioning a steam generator within the formation;
  generating and releasing steam from the steam generator to heat the nanocatalyst heavy oil mixture within the formation;
  forming lighter oil products by hydrogenating the heavy crude oil within the nanocatalyst heavy oil mixture; and
  extracting the lighter oil products from the formation.

51. The method of claim 50, wherein the nanocatalyst comprises a metal selected from the group consisting of iron, nickel, molybdenum, tungsten, titanium, vanadium, chromium, manganese, cobalt, alloys thereof, oxides thereof, sulfides thereof, derivatives thereof, and combinations thereof.

52. The method of claim 51, wherein the nanocatalyst comprises iron and a metal selected from the group consisting of nickel, molybdenum, tungsten, titanium, vanadium, chromium, manganese, cobalt, alloys thereof, oxides thereof, sulfides thereof, derivatives thereof, and combinations thereof.

53. The method of claim 52, wherein the nanocatalyst comprises iron, nickel, and molybdenum.

54. The method of claim 51, wherein the nanocatalyst comprises a nickel compound and a molybdenum compound.

55. The method of claim 51, wherein the nanocatalyst is supported on carbon nanoparticulate.

56. The method of claim 55, wherein the carbon nanoparticulate has a diameter of less than 1 μm.

57. The method of claim 56, wherein the diameter is within a range from about 5 nm to about 500 nm.

58. The method of claim 51, wherein the nanocatalyst is supported on alumina, silica, molecular sieves, ceramic materials, derivatives thereof, or combinations thereof.

59. The method of claim 50, wherein the nanocatalyst heavy oil mixture is heated by the steam to a temperature of less than about 600° F.

60. The method of claim 59, wherein the temperature is within a range from about 250° F. to about 580° F.

61. The method of claim 60, wherein the temperature is within a range from about 400° F. to about 550° F.

62. The method of claim 50, wherein the reducing agent comprises a reagent selected from the group consisting of hydrogen gas, carbon monoxide, synthetic gas, tetralin, decalin, derivatives thereof, and combinations thereof.

63. The method of claim 62, wherein the nanocatalyst and the reducing agent are co-flowed into the formation.

64. The method of claim 63, wherein the reducing agent comprises hydrogen gas.

65. The method of claim 64, wherein the hydrogen gas has a partial pressure of about 100 psi or greater within the formation.

66. The method of claim 50, wherein the steam is generated by combusting oxygen gas and hydrogen gas within the steam generator.

67. The method of claim 66, wherein the oxygen gas and the hydrogen gas are each transferred from outside of the formation, through a borehole, and into the formation.

68. The method of claim 50, wherein the steam is generated by combusting oxygen gas and a hydrocarbon gas within the steam generator.

69. The method of claim 68, wherein the oxygen gas and the hydrocarbon gas are each transferred from outside of the formation, through a borehole, and into the formation.

70. The method of claim 69, wherein the hydrocarbon gas comprises methane.

71. The method of claim 50, further comprising reducing viscosity of the heavy crude oil by exposing the nanocatalyst heavy oil mixture to carbon dioxide.

72. The method of claim 71, wherein the carbon dioxide is transferred from outside of the formation, through a borehole, and into the formation.

73. The method of claim 50, wherein the lighter oil products comprise a lower concentration of a sulfur impurity than the heavy crude oil.

74. The method of claim 73, wherein the lighter oil products comprise about 50% by weight or less of the sulfur impurity than the heavy crude oil.

75. The method of claim 74, wherein the lighter oil products comprise about 30% by weight or less of the sulfur impurity than the heavy crude oil.

76. A method for recovering petroleum products from a petroleum-bearing formation, comprising:
flowing a carrier gas through a first vessel containing a first batch of a catalytic material comprising a nanocatalyst within a first vessel;
preparing a second batch of the catalytic material within a second vessel;
flowing the catalytic material and the carrier gas from the first vessel and into a formation comprising a heavy crude oil, wherein the nanocatalyst and the heavy crude oil form a nanocatalyst heavy oil mixture;
exposing the nanocatalyst heavy oil mixture to a reducing agent;
positioning a steam generator within the formation;
generating and releasing steam from the steam generator to heat the nanocatalyst heavy oil mixture within the formation;
forming lighter oil products by hydrogenating the heavy crude oil within the nanocatalyst heavy oil mixture; and
extracting the lighter oil products from the formation.

77. The method of claim 76, wherein the carrier gas comprises carbon dioxide.

78. The method of claim 76, wherein preparing the second batch of the catalytic material further comprises combining the nanocatalyst and nanoparticulate within the second vessel.

79. The method of claim 78, wherein the nanocatalyst comprises a metal selected from the group consisting of iron, nickel, molybdenum, tungsten, titanium, vanadium, chromium, manganese, cobalt, alloys thereof, oxides thereof, sulfides thereof, derivatives thereof, and combinations thereof.

80. The method of claim 79, wherein the nanoparticulate comprises carbon, alumina, silica, molecular sieves, ceramic materials, derivatives thereof, or combinations thereof.

81. The method of claim 80, wherein the nanoparticulate has a diameter of less than 1 µm.

82. The method of claim 81, wherein the diameter is within a range from about 5 nm to about 500 nm.

83. A method for recovering petroleum products from a petroleum-bearing formation, comprising:
flowing a nanocatalyst and a reducing agent into a formation comprising a heavy crude oil, wherein the nanocatalyst and the heavy crude oil form a nanocatalyst heavy oil mixture;
heating the nanocatalyst heavy oil mixture within the formation to a temperature of less than about 600° F.;
forming lighter oil products by hydrogenating the heavy crude oil within the nanocatalyst heavy oil mixture; and
extracting the lighter oil products from the formation.

84. The method of claim 83, wherein heating the nanocatalyst heavy oil mixture within the formation further comprises flowing heated gas, liquid, or fluid from outside of the formation, through a borehole, and into the formation while exposing the nanocatalyst heavy oil mixture.

85. The method of claim 84, wherein the nanocatalyst heavy oil mixture is exposed to heated water, steam, or combinations thereof.

86. The method of claim 83, wherein the nanocatalyst heavy oil mixture is heated within the formation by an electric heater positioned within the formation.

87. The method of claim 83, wherein heating the nanocatalyst heavy oil mixture within the formation further comprises:
positioning a steam generator within the formation; and
generating and releasing steam from the steam generator to heat the nanocatalyst heavy oil mixture within the formation.

88. The method of claim 83, wherein the temperature is within a range from about 250° F. to about 580° F.

89. The method of claim 88, wherein the temperature is within a range from about 400° F. to about 550° F.

* * * * *